United States Patent [19]
Shea et al.

[11] 3,752,498
[45] Aug. 14, 1973

[54] OLEO-PNEUMATIC SUSPENSION ASSEMBLY

[75] Inventors: James M. Shea; Claude A. Thorsby; Kenneth L. Westercamp, all of Saginaw, Mich.

[73] Assignee: General Motors Corporation, Detroit, Mich.

[22] Filed: Oct. 7, 1971

[21] Appl. No.: 187,415

[52] U.S. Cl....... 280/124 F, 267/64 R, 280/104.5 R
[51] Int. Cl............................................. B60g 17/04
[58] Field of Search ........... 280/124 F, 6 H, DIG. 1, 280/104.5 R; 267/64

[56] References Cited
UNITED STATES PATENTS

| 3,593,978 | 7/1971 | Lohr | 267/64 R |
| 2,976,032 | 3/1961 | Sampietro | 267/64 R |
| 2,146,089 | 2/1939 | Onions | 267/64 R |

Primary Examiner—Philip Goodman
Attorney—W. S. Pettigrew and J. C. Evans et al.

[57] ABSTRACT

In preferred form, a vehicle suspension device including a gas spring formed in part by an oil-filled, variable volume oil reservoir for a shock absorber. The device includes a hollow piston that reciprocates into and out of a shock absorber pressure cylinder in response to normal road movements. A spool divides the hollow piston into an oil charging chamber and an oil pressure chamber and the oil pressure chamber is connected to an external source of oil pressure which is selectively communicated with the inner cylinder to change the position of the spool axially therein thereby to change the amount of oil within the oil filled reservoir of the shock absorber to change the gas spring pressure in accordance with changes of vehicle loading thereby to maintain a predetermined height relationship between the sprung and unsprung mass of the vehicle.

5 Claims, 8 Drawing Figures

PATENTED AUG 14 1973

INVENTORS
James M. Shea,
Claude A. Thorsby, &
Kenneth L. Westercamp
BY J.C. Evans
ATTORNEY INVENTORS.
James M. Shea,
Claude A. Thorsby, &
Kenneth L. Westercamp
BY J.C. Evans
ATTORNEY

OLEO-PNEUMATIC SUSPENSION ASSEMBLY

This invention relates to oleo-pneumatic suspension devices and more particularly to suspension devices which include a combination gas spring for leveling a vehicle and a shock absorber for damping relative road movements between the sprung and unsprung mass of the vehicle.

Various kinds of combined air and oil leveling suspension devices have been proposed which produce a variable spring rate. In certain devices of this type, energy-absorbing components are included to damp relative movement between the sprung and unsprung mass of the vehicle.

In some cases an air compressor is provided on the vehicle to charge the device to vary its load supporting characteristics in accordance with changes in the vehicle load to maintain a desired vehicle height relationship. In other cases, a built-in pump is included in the device to discharge oil into an energy accumulating device from whence oil is discharged to produce vehicle leveling.

An object of the present invention is to provide a self-contained, variable rate oleo-pneumatic suspension unit which includes a combination gas spring and energy absorbing hydraulic dampening components and means to vary the pressurization of the gas spring portion of the device by an oil pressure system external to the device.

Still another object of the present invention is to improve a vehicle suspension by the provision of two combination oleo-pneumatic assemblies, each mounted between the unsprung mass of a four-link rear suspension and the frame of the vehicle and wherein the suspension devices each include a gas spring which has the volume therein varied in accordance with oil flow from a first hydraulic fluid pressure system which is directed into and out of the device in accordance with changes in the height relationship between the sprung and unsprung masses of the vehicle thereby to displace hydraulic fluid of a second hydraulic fluid pressure system into a shock absorber reservoir which is formed in part by an elastomeric bladder which makes up the movable wall portion of the gas spring in the device.

Still another object of the present invention is to provide a compact, reliable unit for maintaining a predetermined height relationship between the sprung and unsprung mass of a vehicle wherein the pressure of a gas spring component of the device is varied by means including a shock absorber which has a low profile vortex valve therein which controls the flow of hydraulic fluid from within a pressure chamber of a shock absorber into an oil filled variable volume reservoir chamber thereof to dampen road movements of the vehicle, and wherein the valve is operative to permit flow of oil from the pressure chamber of the shock absorber when there is a load change on the vehicle so as to displace a controlled amount of oil into the reservoir to displace the inner cylinder to increase the spring length to compensate for the change in load.

Still another object of the present invention is to improve hydraulic dampening in a combination oleo-pneumatic load leveling device by the provision of a unitary valving element at the end of a hollow pressure cylinder through which oil is passed during opposite reciprocation of a shock absorber piston into and out of an oil filled reservoir formed in part by an elastomeric bladder of a gas spring, the unitary valving element having no moving parts and a vortex pressure chamber and circumferentially spaced slots forming a plurality of sharp edges and surfaces to obtain dampening in the device.

These and other objects of the invention are provided in one working vehicle suspension embodiment which includes two oleo-pneumatic suspension assemblies mounted between the unsprung mass of a four-link rear suspension and the frame of the vehicle.

Each of the assemblies has an outer cylinder sealingly attached to an intermediate cylinder which supports an inner cylinder or sliding piston. A yoke is attached to the inner cylinder to connect it to the vehicle frame and also to provide an inlet to direct hydraulic fluid into the device.

A seal assembly and wiper scraper around the inner cylinder prevents loss of fluid from the assembly. An outer cylinder end cap and seal means provides a strong gas-tight attachment between an outer cylinder of the device and the intermediate cylinder therein.

An elastomeric bladder is supported in surrounding relationship to the intermediate cylinder to separate a high-pressure gas space in the device from an internal hydraulic circuit in the device. A spool and seal assembly is slidably supported within the inner cylinder to separate it into an oil charging chamber and an oil pressure chamber. The spool separates an external hydraulic system connected to the yoke inlet from the internal hydraulic system of the device. The spool is translatable axially inside the inner cylinder to vary the volume of oil within an oil-filled variable volume reservoir portion of the device which is formed in part by the elastomeric bladder.

When fluid from the external system is directed into the charging chamber, the spool is shifted axially into the device to increase the oil volume in the reservoir; this increases the extension of the inner cylinder to compensate or correct for vehicle load change. When the vehicle is unloaded oil is directed from the charging chamber to cause the spool to move axially outwardly of the device and thereby draw oil from the oil filled reservoir to reduce the extension of the inner cylinder. This moves the vehicle frame to maintain the height relationship between the sprung and unsprung mass of the vehicle. During vehicle operation, the inner cylinder moves into and out of the intermediate cylinder to displace oil between the intermediate cylinder and the annular reservoir across a low profile, unitary vortex valve which produces hydraulic dampening without moving parts.

Further objects and advantages of the present invention will be apparent from the following description, reference being had to the accompanying drawings wherein a preferred embodiment of the present invention is clearly shown.

Figure 1:
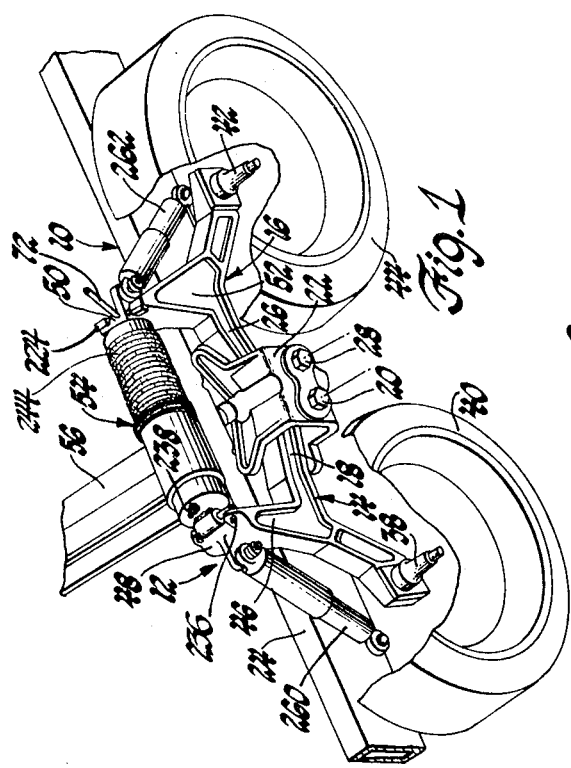
FIG. 1 is a view in perspective of a tandem rear axle arrangement including the suspension device of the present invention.

Referring now more particularly to the drawings in FIG. 1 a rear axle assembly 10 is illustrated including two tandem wheel assemblies, one of which is illustrated at 12, it being understood that another like wheel assembly is provided on the other side of the vehicle.

Each of the tandem wheel assemblies include a pair of lower control arms 14, 16.

The control arm 14 includes one end 18 thereon pivotally connected by a bolt 20 through a frame bracket 22 which is secured by bolt 20 and a fastener (not illustrated) to a side frame member 24 of the sprung mass portion of a vehicle.

The lower control arm 16 has one end 26 thereon pivotally secured to the bracket 22 by bolt 28 which also serves to secure the bracket 22 to the side frame member 24.

Figure 2:
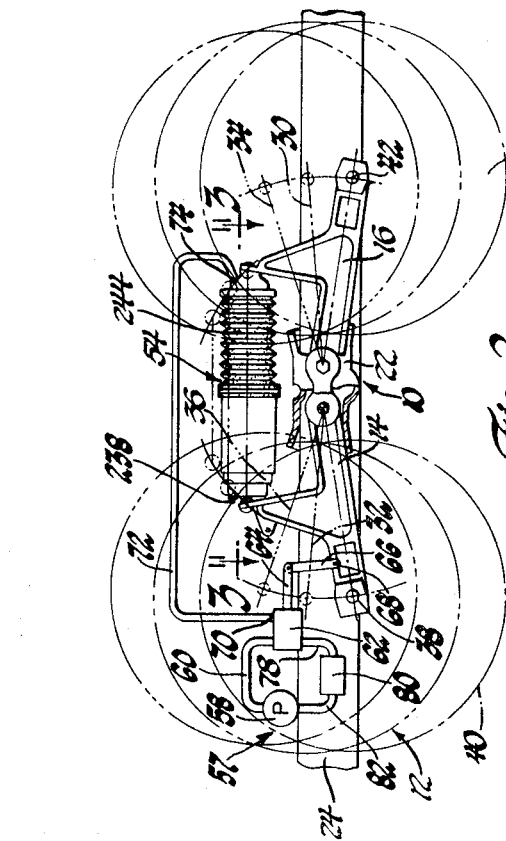
FIG. 2 is a side elevational view of a rear suspension system utilizing the device of the present invention.

In the illustrated arrangement, each of the control arms 14, 16 pivot about the axes defined by bolts 20, 28 to assume a plurality of operative positions, including an extended position illustrated in solid lines in FIG. 2; an angularly upwardly located normal position represented by the broken lines 30, 32 in the illustration of FIG. 2; and a retracted position illustrated by the dotted lines 34, 36 in FIG. 2.

The control arm 14 has a wheel spindle 38 on which one wheel assembly 40 of the tandem assembly 12 is supported for rotation and for movement between the solid line extended position and the normal position represented by the dotted line 30 and 32. Likewise, the lower control arm 16 has a wheel spindle 42 on which is secured a wheel assembly 44 that is movable by the control arm 16 between the solid line extended position, and the dotted line normal and retracted positions of FIG. 2.

The control arm 14 has an upstanding portion 46 thereon which includes a connecting bracket 48 thereon located in spaced relationship to a connecting bracket 50 on a like upstanding portion 52 of the lower control arm 16.

The brackets 48, 50 have an improved oleo-pneumatic suspension device 52 secured therebetween for positioning the wheels in the previously mentioned control positions with respect to the frame 24 of the vehicle.

In the illustrated arrangement, the side frame member 24 is secured to a cross frame member 56 which has the opposite end thereof connected to a like side frame member (not illustrated) adjacent a like tandem wheel assembly on the other side of the vehicle.

The improved oleo-pneumatic suspension device 54 is operatively associated with a first hydraulic system 57 including a first pressurized fluid, for example, it can be associated with a hydraulic supply system which utilizes flow from the power steering pump of a vehicle.

More particularly, a power steering pump 58 is diagrammatically illustrated as having a discharge conduit 60 therefrom in communication with a height control valve assembly 62 operated by a control arm 64 pivotally connected at one end thereof to an operating link 66 which is secured by means of a pin 68 to the lower control arm 14. The opposite end of the actuator 64 is secured to movable components of the valve assembly 62 to regulate flow of hydraulic fluid from the discharge conduit 16 through an outlet 70 of the valve assembly 62 and a supply and exhaust conduit 72 leading to an oil fitting 74 formed in an upper yoke member 76 of the device 54.

Oil will either flow from the conduit 72 through the fitting 74 or be returned from the fitting 74 through conduit 72 back to the valve assembly 62. The return or exhaust flow from the fitting 74 is controlled by the valve 62 and is directed through an exhaust conduit 78 which communicates with a reservoir 80 in turn connected by a conduit 82 to the inlet of the pump 58.

Under conditions where the vehicle is heavily loaded to cause the sprung frame components 24, 56 to move downwardly, the lower control arm 14 will pivot about the pin 20 into either the normal or retracted position. When this occurs, the link 66 pushes upwardly on the actuator arm 64 to condition the valve 62 to communicate the discharge conduit 60 from the pump 58 with the supply and exhaust conduit 72 thereby to charge the device 54 with oil for reasons to be discussed. When the device is charged with oil it will compensate for the additional load on the sprung mass represented by frame components 24, 56 to move the wheel assemblies 40, 42 back to their normal positions 30, 32 respectively.

Likewise, when the vehicle is unloaded the device 54 will expand to move the control arms 14, 16 to their extended position at which point the control arm 14 will cause the link 66 to move the actuator arm 64 in a direction to condition the valve 62 to communicate the supply and exhaust conduit 72 with the reservoir 80 whereby oil is exhausted from the device 54 to return the vehicle to its normal position.

In accordance with certain principles of the present invention, the device 54 is able to be positioned into multiple leveling relationships by means of a first hydraulic supply and includes a second internal hydraulic supply separate from the first hydraulic supply to provide an integral road movement damping function in the device 54.

A further feature of the present invention is that the device 54 includes an integral gas spring component therein responsive to control by the valve 62 to vary the load supporting capability of the device 54 thereby to maintain a predetermined height relationship between the sprung frame components of the vehicle and unsprung wheel assemblies.

Figure 3:
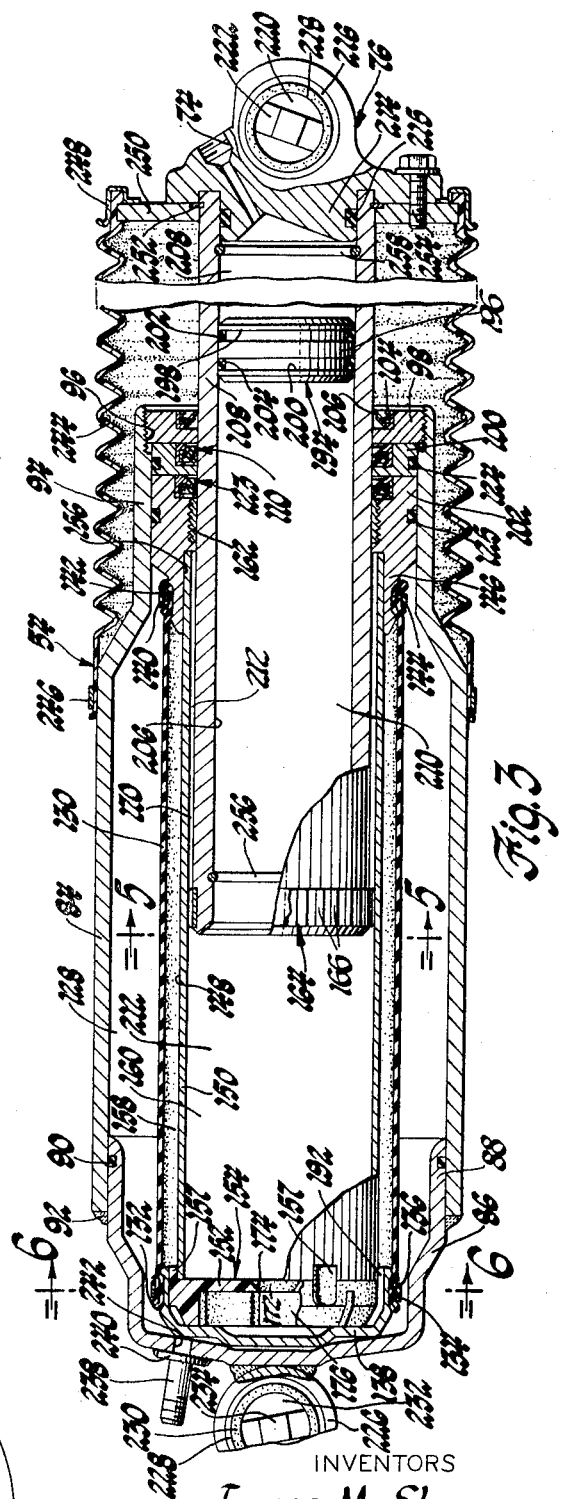
FIG. 3 is an enlarged horizontal sectional view taken along the line 3—3 of FIG. 2 looking in the direction of the arrows.

In order to understand the relationship between the multi-fluid hydraulic systems and the integral gas spring, reference may be had to FIG. 3 which more particularly sets forth the improved oleo-pneumatic suspension device 54.

The device includes an upper outer cylinder portion 84 which has a first large diameter open end closed by a lower outer cylinder portion 86 formed in a cup configuration.

More particularly, the lower outer cylinder 86 includes an extension 88 thereon supportingly received within the end of the outer cylinder 84 and sealed with respect thereto by an O-ring seal 90 supported within the extension 88.

A weld 92 is formed around the lower edge of the outer cylinder 84 and circumferentially around an outwardly located portion of the extension 88 to secure the two parts of the outer cylinder together.

The opposite end of the outer cylinder 84 is defined by an open ended small diameter neck 94 which has an open threaded end 96 thereon in which is threadably located a cylinder retainer member 98.

The cylinder retainer member 98 holds a seal spacer ring 100 in place against the upper end of an outer cylinder end cap 102 slidably received axially inwardly of the reduced diameter 94 of the outer cylinder 84.

The cylinder retainer member 98 includes an annular wiper 104 therein with a flexible lip 106 which slidably engages the outer surface of a sliding, hollow inner cylinder element 108 which is directed through concentrically located openings in the cylinder retainer member 98, the seal spacer ring 100 and the outer cylinder end cap 102.

Figure 4:
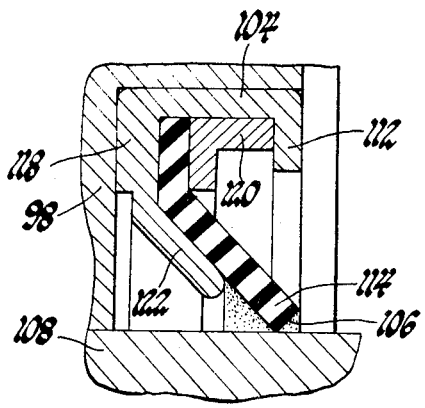
FIG. 4 is an enlarged fragmentary vertical sectional view of a portion of a wiper in the device of the present invention.

The wiper 104 is best illustrated in FIG. 4, as including a support ring 112 that is formed circumferentially around an annular wiper element 114 that includes a lip 106 thereon in engagement with the outer surface of the cylinder 108 and a flange 118 which is secured in the ring 112 by a lock ring 120.

The support ring 112 includes a radially inwardly located, downwardly inclined edge 122 thereon which overlies the wiper 116 to reinforce it aganist being flexed inwardly of the cylinder 84. A seal 110 in ring 100 is held between member 98 and cap 102.

A seal 123 is held between end cap 102 and spacer ring 100. Together the seals 110, 123 seal against oil leaks from the device 54.

Spaced annular O-rings 124, 125 are located in the spacer ring 100 and the outer cylinder end cap 102 to seal the inside diameter of the neck 94 to prevent leakage of gas from a gas spring cavity 128 which is formed by the outer cylinder 84, the lower outer cylinder cup 86, and an elastomeric bladder formed as an extruded rubber tube 130.

The extruded rubber sleeve or tube 130 has one end at 132 secured by means of a magnetically formed ring 134 to the outer grooved surface 136 of a bladder retaining cup 138 which has the base portion thereon supported by the end of the cup 86.

The opposite end of the tube 130 is secured at 140 and is secured by means of a magnetically formed ring 142 within a circumferential groove 144 formed in a small diameter extension 146 on the end cap 102.

In the illustrated arrangement, the tube 130 is located in spaced relationship to the outer surface 148 of an intermediate pressure cylinder 150 which has one end thereof held against the end 152 of a vortex valve 154 and the opposite end thereof fitted within a bore 156 in the end cap extension 146. A plurality of tabs 157 on assembly 154 are located at spaced circumferential points thereon to hold it on the cylinder 150.

The intermediate cylinder 150 serves as the high pressure oil cylinder of a shock absorber comprised of the inner cylinder 108, the vortex valve 154 and an annular variable volume oil filled reservoir 158 which is defined by an annular space between the rubber tube 130 and the pressure cylinder 150.

The inner cylinder 108 is reciprocated into and out of the cylinder 150 to displace oil which fills a pressure space 160 within the cylinder 150 into and out of the variable volume reservoir 158.

Figure 5:
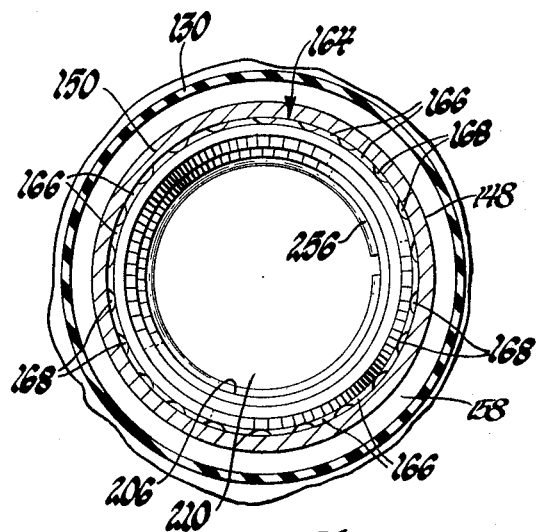
FIG. 5 is an enlarged cross sectional view taken along the line 5—5 of FIG. 3 looking in the direction of the arrows.

More specifically, the inner cylinder 108 is supported for reciprocation within the cylinder 150 by means including a guide bushing 162 supported within the central bore through the end cap 102. It is additionally supported for reciprocation within the cylinder 150 by means of a lower guide bushing 164 which is best illustrated in FIG. 5 as including a plurality of circumferentially spaced radially outwardly directed ribs 166 thereon which slidably engage the inner surface of the cylinder 150 during opposite reciprocation of inner cylinder 108.

Semicircular openings 168 are present between each of the ribs 166 to allow free flow of oil from the end of the rod 108 into a small annular space 170 formed between the outer diameter of the cylinder 108 and the inner diameter of the cylinder 150.

Figure 6:
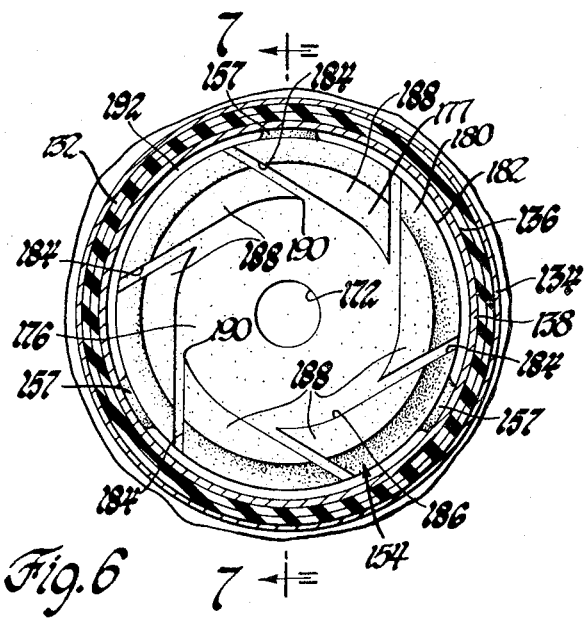
FIG. 6 is an enlarged cross sectional view taken along the lines 6—6 of FIG. 3 looking in the direction of the arrows.
Figure 7:
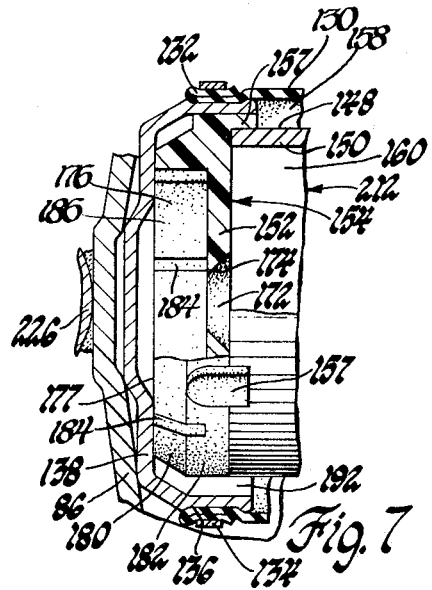
FIG. 7 is a fragmentary sectional view taken along the line 7—7 of FIG. 6 looking in the direction of the arrows.
Figure 8:
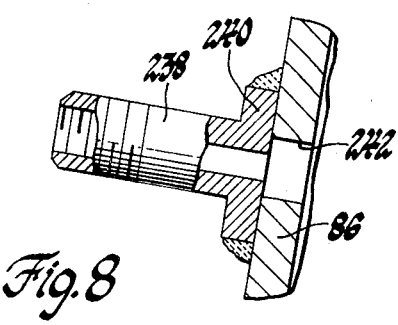
FIG. 8 is a fragmentary vertical sectional view of a valve body portion of the device.

The vortex valve 154 is best illustrated in FIGS. 6 and 7, as a single unitary member preferably made of a plastic material such as a phenolic resin. The upper end 152 thereon is extended completely across the full planar extent of the lower open end of the pressure cylinder 150 to close it to flow except through a centrally located opening 172 which includes a radially outwardly flared inlet surface 174 having a 45° inclination with respect to the longitudinal axis of cylinder 150.

The opening 172 leads into a vortex chamber 176 formed between an annular flange 177 on the valve 154 which is sealingly seated against the inner end surface 178 of the bladder retaining cup 138.

The annular flange 177 is joined to a tapered peripheral surface 180 that merges with an axially extending circumferential surface 182 that joins the inclined surface 180 with the top surface 152 as is best illustrated in FIG. 7.

The member includes six, equally circumferentially spaced slots 184 each of which is tangent to an inside diameter 186 located radially inwardly of the outer surface 182.

Each of the slots 184 is formed in part by a surface 188 inclined from end 152 to the surface 177 as best seen in FIG. 6. Each surface 188 has a knife-edge 190 thereon which will direct oil flow from the vortex chamber 176 into one of the slots 184 to flow into relief passageways 192 between cup 138 and valve 154 leading to the shock absorber reservoir 158.

One feature of the present invention is the provision of a spool assembly 194 made up of a cylindrical member 196 having axially spaced grooves 198, 200 therein in which are seated annular O-rings 202, 204 slidably, sealingly contacting the inner wall 206 of the inner cylinder 108 to divide it into a liquid charge chamber 208 and a pressure chamber 210 which communicates with a variable volume chamber 212 formed between the inner cylinder 108 and the intermediate cylinder 150 above the vortex valve 154.

The chamber 208 is closed at the upper end by an extension 214 on the yoke assembly 76.

The extension 214 is seated in the upper end of the intermediate cylinder 108 and is sealed by means of an annular O-ring gasket 215.

The charge chamber 208 is connected via the inlet 74 with the hydraulic system illustrated in FIG. 2.

The yoke assembly 76 includes a bushing 216 directed therethrough in which is fitted a rubber bushing 218 in which is inserted a bracket member 220 having a pair of outwardly extending ears 222 at opposite ends thereof which are connected by means of bolts 224 to the end bracket 46 as illustrated in FIG. 1.

At the opposite end of the device a mounting ring 226 is secured to the base of the lower outer cylinder 86 that includes a bushing 228 therethrough in which is fitted a rubber bushing 230 having a bracket member 232 directed therethrough with ears 234 thereon secured to the upstanding arm portion 52 shown in FIG. 1 by means of bolts 236.

The lower outer cylinder also includes a valve body 238 thereon including a flange 240 welded to the base of the lower cylinder 86 around a gas supply port 242 therein which is in communication with the gas chamber 128. In the illustrated arrangement, the gas chamber 128 is precharged with 330 p.s.i.g. of nitrogen, to provide the elastic medium for varying the spring output of the assembly.

A seal boot 244 surrounds the upper end of the device 54 to protect the outer surface of cylinder 105. It has a bellows configuration to allow reciprocation of inner cylinder 108 into and out of outer cylinder 84. A clamp 246 connects the one end of boot 244 to cylinder 84 and a clamp 248 connects the opposite end of boot 244 to a yoke retainer plate 250 which is held in place by a snap ring 252 in an undercut groove in cylinder 108. It is also secured to yoke 76 by screws 254.

By virtue of the aforesaid combination of elements, the device 54 includes an integral spring suspension, a shock absorbing capability as well as a system for leveling a vehicle to compensate for load changes on the sprung chassis thereof.

More particularly, during normal operation of the hydraulic fluid in the hydraulic system 57 is directed to the inlet 74 of the yoke 76 into the charge chamber 208 to cause the spool assembly 194 to move axially inwardly of the inner cylinder 108. As mentioned above, pressurized chamber 210, the variable volume chamber 212 and the annular chamber 158 constituting the reservoir of the hydraulic portion of the device 54 is charged with a second charge of hydraulic fluid separate from the fluid in system 57. Thus, the axial movement of the spool assembly 194 acts as a positive displacement pump to displace oil into the annular reservoir 158 across the valve 154 until a pressure build-up in the gas chamber 128 occurs that will produce a resultant force between the ends of the device 54 sufficient to suspend the load of the vehicle. Maximum inward travel of spool 194 is limited by a snap ring 256 on the I.D. of inner cylinder 108.

The leveling valve 62 will block communication between the charge chamber 208 and the system 57 when the vehicle is in the normal level position as shown by the dotted lines 30 and 32 in FIG. 2.

While in the level position of operation, the device 54 will carry out a shock absorbing action against normal road movement between the sprung and unsprung mass of the vehicle. More particularly, any movement that will tend to cause the wheel assemblies 40, 44 to move upwardly with respect to the frame 24 will cause the upstanding arms 46, 52 to move closer together thereby causing the inner cylinder 108 to move inwardly of the intermediate cylinder 150. During this movement, the bushing 164 guides the inner cylinder and slidingly supports it within the intermediate cylinder 150. The seal and assemblies 106, 110, 123 will prevent oil leakage from the chamber 170 and an amount of oil equal to the volume of the inner cylinder 108 will be displaced from the variable volume chamber 212 to flow through the central opening 174 of the valve 154 into the vortex chamber 176. At this point, the oil is sheared by the edges 190 and directed through the equally spaced slots 184 to the periphery of the valve assembly 154 to flow through the passageways 192 into the reservoir 158.

The oil has a predetermined viscosity and the vortex valve assembly will produce a shear force thereon which will build up the pressure in the variable volume chamber 212 and the pressurized chamber 210 thereby to produce a resultant velocity dependent force on the inner cylinder 108 that will resist the tendency of the arms 46, 52 to move closer together.

Likewise, on a rebound movement with the wheel assemblies 40, 44 moving apart from the sprung side frame 24, the volume of the inner cylinder 108 which moves exteriorly from the intermediate cylinder 150 will be replaced by a like volume of oil from the annular reservoir 158. The oil will flow from the reservoir 158 through the axial passageways 192, thence through the equally spaced slots 184 back into the vortex chamber 176 for flow through the central opening 174. The reverse flow through the vortex valve 154 will be properly restricted. During this movement, there is a limited oil flow from the space 170 between the intermediate cylinder 150 and the inner cylinder 108 across the grooves 168 of the bushing assembly 164 to produce a rebound damping control.

During an unloading phase of operation, when the vehicle chassis has a load removed therefrom, the spring force of the device 54 will be too great and thereby will cause the upstanding arms 46, 52 to move apart to position the device as shown in solid lines in FIG. 2. This extended position will raise the sprung mass above the desired predetermined height relationship and at the same time the link 66 will condition the valve 62 to communicate the charge chamber 208 of the device with the reservoir 80 through the conduit 72 and valve 62. Oil will exhaust from the device thereby causing the spool assembly 194 to move in the inner cylinder toward the yoke 76. A snap ring 258 in surface 206 limits travel of assembly 194 in this direction.

Eventually, the pressure of the gas spring 128 is reduced until the spring effect of the device 54 is balanced against the reduced load. At this point, the vehicle is again leveled and the valve 62 will block communication between the device 54 and system 57.

The remaining phase of operation is a load correction stage wherein a greater load is placed on the chassis 24.

During this leveling stage of operation an additional load is placed on the vehicle and the spring rate of the device 54 initially is unable to support the added load. The upstanding arms 46, 52 thereby will move together to allow the control arms and device to assume the dotted line position 34, 36 shown in FIG. 2. The inner cylinder 108 moves inwardly displacing oil from chamber 210 to chamber 158 increasing the pressure of the nitrogen gas until sufficient resultant force is produced to support the new vehicle load. At this point, the control link 66 will condition the valve 62 to communicate the charge chamber 208 with hydraulic pump 58. Pressurized oil is directed from pump 58 through the discharge conduit 60, the valve 62, and the supply conduit 72 to enter charge chamber 208 thereby to cause the spool assembly 194 to shift axially inwardly of the inner cylinder 108 to displace oil from the chamber 210 within inner cylinder 108 causing it to be extended slidably relative to intermediate cylinder 150, restoring the position of arms 46 and 52 to their normal location as shown in FIG. 2, dotted line position 30, 32. At this point the control valve 62 again cuts off communication and the only difference between this and a prior level operating stage of operation will be the axial position of the spool assembly 194 in the inner cylinder 108.

Thus, the mode of operation permits a first external hydraulic system to produce a variation of oil flow into a charge chamber 208 and axial movement of a single spool assembly 194 to produce a positive displacement in a second hydraulic oil system into and out of an annular reservoir 158 to change the spring support characteristics of the device 54. Concurrently, normal road movement will be damped under the control of a vortex valve assembly 154 during compression or retraction movement of the device 54 and damping across the bushing 164 during extension or rebound movement of the device 54.

The combination of leveling, spring and shock absorbing control is all accomplished within a highly compact configuration of parts. Desired additional damping can be provided by one or more of standard double, direct-acting hydraulic shock absorbers. A pair of shocks 260, 262 are representatively shown connected between frame 24 and arm 46, arm 52 respectively.

While the embodiments of the present invention, as herein disclosed, constitute a preferred form, it is to be understood that other forms might be adopted.

What is claimed is as follows:

1. A vehicle suspension device including a first cylinder adapted to be connected to the sprung mass of the vehicle and a second cylinder adapted to be connected to the unsprung portion of the vehicle, means including one of said cylinders for forming a pressurized gas spring, means defining a fluid-filled reservoir between said spring and the other of said cylinders, means including said other of said cylinders defining a positive displacement fluid pump for varying the amount of fluid in the reservoir to vary the pressure in said gas spring, damper valve means including a unitary valving element having an upper surface and a peripheral flange thereon forming a vortex chamber, said element including a plurality of spaced slots tangential to a diameter on the valving element located radially inwardly of the outer circumference thereof, each of said slots including a sharp leading edge located inwardly of the vortex chamber therein for communicating the vortex chamber with the outer peripheral edge of the valve whereby vehicle movement will cause fluid to be directed through said slots into and out of the reservoir for damping relative movement between the unsprung mass and sprung mass, said positive displacement fluid pump including an inner cylinder and a spool axially movable within the inner cylinder, and means defining an oil charge chamber on one side of said spool, said charge chamber adapted to be connected to a fluid pressure source separate from fluid in said pump to move said spool axially within said inner cylinder to vary the amount of oil within the reservoir in accordance with vehicle load to change the pressure of the gas spring to balance changes in the load on the sprung mass of the vehicle.

2. A combination spring and damping suspension unit for leveling between the sprung and unsprung mass of the vehicle comprising; gas spring means including an outer cylinder having an open end, an end closure closing the open end of said outer cylinder, means including an elastomeric sleeve connected between the end closure and said outer cylinder defining a variable volume gas space, an intermediate cylinder located coaxially of the outer cylinder having one end thereof supported by said end closure and the opposite end thereof supported by said outer cylinder, an oil reservoir formed between said intermediate cylinder and the elastomeric sleeve, a valve member closing one end of said intermediate cylinder for controlling oil flow from within the intermediate cylinder to the oil reservoir, an inner cylinder located in telescoping relationship with the intermediate cylinder having one end thereof extending outwardly of said intermediate cylinder and the outer cylinder, means for connecting the outwardly extending end of said inner cylinder to a first portion of a vehicle suspension, means for connecting the outer cylinder to another portion of a vehicle suspension, said inner cylinder reciprocating into and out of the intermediate cylinder in response to vehicle movement, said inner cylinder displacing oil between said reservoir and said intermediate cylinder under the control of said valve to damp vehicle movement, a spool assembly slidably supported within said inner cylinder for axial movement therein, said spool assembly separating said inner cylinder into an oil charge chamber and an oil pressurization chamber, means for connecting the oil charge chamber to a separate oil pressure source for directing a greater amount of oil into the oil charge chamber when the vehicle is loaded thereby to cause the spool assembly to shift axially inwardly of the inner cylinder to displace oil from the oil pressurization chamber and the intermediate cylinder into the annular reservoir for displacing the sleeve into the gas space to increase the gas pressure therein to support the additional load.

3. A combination spring and leveling unit form maintaining a predetermined height relationship between the sprung and the unsprung mass of the vehicle comprising means defining an outer gas spring including an elastomeric sleeve, an openended high-pressure oil cylinder located within said bladder, a seal assembly closing the open end of said pressure cylinder, said pressure cylinder and said sleeve defining an oil reservoir therebetween, valve means controlling the oil flow from within the pressure cylinder to the reservoir for damping relative movement between the sprung and the unsprung mass, an inner cylinder member having opposite open ends, said inner cylinder located in telescoping relationship within the pressure cylinder including one end thereon adapted to be connected to one portion of the vehicle suspension, means on the gas spring adapted to be connected to another portion of the vehicle suspension whereby upon relative movement between the first and second portions of the suspension, the inner cylinder reciprocates into and out of the intermediate cylinder in response to road movement to displace oil into and out of the intermediate cylinder and said reservoir, means for leveling the vehicle including a spool member located within said inner cylinder and separating it into an oil charge chamber and an oil pressurization chamber, means responsive to changes in the loading on the sprung mass of the vehicle to direct oil into and exhaust oil from the oil charge chamber to cause the spool to shift axially within the inner cylinder thereby to displace oil from the inner cylinder into the intermediate cylinder and the annular reservoir when the vehicle is loaded against the sleeve to increase the pressure in the gas spring until the pressure therein will support the changed vehicle load, said spool being moved axially within the inner cylinder when the load is removed to draw oil from the annular reservoir to the intermediate cylinder and inner cylinder to reduce the pressure within the gas spring when the vehicle is unloaded so as to return the vehicle to maintain a predetermined height relationship between the sprung and unsprung masses of the vehicle.

4. A hydro-pneumatic suspension device comprising an outer cylindrical member having a closed end and an open end, a retaining cup supported on the closed end, an outer cylinder end cap closing the open end of the outer cylinder member, an elastomeric sleeve member connected between the outer cylinder cap and said retaining cup to define a sealed gas space between the sleeve and the outer cylinder, an intermediate open-ended cylinder located coaxially of the outer cylinder and including one end thereon supported by the outer cylinder end cap and the opposite end thereof supported with respect to the retaining cup, a reservoir between the intermediate cylinder and sleeve, an inner cylinder member having one end thereof located within the intermediate cylinder, a guide bushing on said inner cylinder for locating said one end thereof for sliding reciprocating movement within said intermediate cylinder, the opposite end of said inner cylinder extending outwardly of said outer cylinder for connection to a portion of a vehicle suspension, means connecting the outer cylinder to another portion of the vehicle suspension for causing reciprocation of the inner cylinder into and out of the intermediate cylinder during relative road movements between the suspension portions, a guide bushing within said outer cylinder cap for supporting the inner cylinder during opposite reciprocation thereof into and out of the intermediate cylinder, a valve member having an annular flange portion seated on said retaining cup and an upper surface thereon extending completely across the full planar extent of the open end of the intermediate cylinder, said valve member having a vortex chamber between the upper surface and the retaining cup, a plurality of slots directed through said flange to communicate said reservoir with said vortex chamber, each of said slots being located along a chord line of the outer circumference of said valve member and tangent to a predetermined diameter located radially within and centrally of the outer circumference of the valve element and each of said slots including a sharp edge for shearing oil that passes from the vortex chamber into the annular oil reservoir, a spool located within said inner cylinder defining a fluid charge chamber and an oil pressurization chamber, means connecting the charge chamber to means for varying the amount of oil flow into and out of the charge chamber in accordance with changes of load on the vehicle, said spool moving axially into the inner cylinder when the load is increased to cause oil to be displaced from the inner cylinder thence to the intermediate cylinder and across the valve into the reservoir to cause the pressure of the gas spring to compensate for load change, said spool being movable axially outwardly of the inner cylinder to draw oil from the annular reservoir thence through the valve and into the intermediate and inner cylinders when the vehicle is unloaded to reduce the pressure in the gas spring to maintain a predetermined desired height relationship between the sprung and unsprung masses of the vehicle.

5. A vehicle suspension and leveling system comprising; a sprung mass portion, a sprung mass frame bracket on said portion, a pair of wheel brackets, each of said wheel brackets having one end thereof pivotally secured to said frame bracket and the opposite end thereof adapted to supportingly receive a portion of an unsprung mass, each of said wheel brackets having an upstanding arm thereon, a combination vehicle leveling and spring device connected between each of said upstanding arms, said device having a first cylinder member pivotally connected to one of said upstanding arms and a yoke member pivotally connected to the other of said arms, a second outer cylinder connected to the first cylinder member, means including an elastomeric sleeve within said outer cylinder member defining a high pressure gas space, an intermediate cylinder located coaxially of said outer cylinder in spaced relationship thereto to define an oil pressure chamber within said outer cylinder, means defining an annular oil reservoir space between said sleeve and the intermediate cylinder, an inner cylinder member slidably supported within said intermediate cylinder member and having one end thereof located outwardly of said outer cylinder and connected to said yoke assembly whereby relative movement between the upstanding arms of said wheel bracket will cause reciprocal movement of said inner cylinder member into and out of said intermediate cylinder in response to vehicle road movements, a spool assembly located within said inner cylinder member for axial slidable movement thereon and defining an oil charge chamber therein and an oil pressurization chamber therein, a source of oil pressure, height control means responsive to changes in vehicle load to direct the oil source to and from the oil charge chamber thereby to axially displace said spool assembly within said inner cylinder to vary oil displacement therefrom into said oil reservoir to increase the pressure within said gas space to compensate for changes of vehicle load, said inner cylindrical member displacing oil from within said intermediate cylinder during normal road movements between the sprung and unsprung mass of the vehicle, and valve means located between the interior of said intermediate cylinder and the annular reservoir for controlling flow of oil therebetween so as to damp normal road movement between the sprung and unsprung mass in accordance with the telescoping movement of the inner cylinder into and out of the intermediate cylindrical member.

* * * * *